[11] 3,611,193

[72] Inventor Paul G. De Baryshe
Lincoln, Mass.
[21] Appl. No. 889,094
[22] Filed Dec. 30, 1969
[45] Patented Oct. 5, 1971
[73] Assignee American Optical Corporation
Southbridge, Mass.

[54] HEADER FOR A LASER ROD
10 Claims, 4 Drawing Figs.
[52] U.S. Cl. ................................................ 331/94.5,
350/96, 350/175 GN
[51] Int. Cl. .................................................. H01s 3/05
[50] Field of Search........................................... 331/94.5;
350/175 GN, 96

[56] References Cited
UNITED STATES PATENTS
3,311,846 3/1967 Simpson et al................. 331/94.5

FOREIGN PATENTS
1,026,596 4/1966 Great Britain................ 331/94.5

OTHER REFERENCES

Roess, " Analysis of .... The Reeby Laser as a Thermal Lens," J. Applied Physics, vol. 37, no. 9, August 1966, pp. 3587– 3594.

Ross, " Messurg der Thermixchen...Plan-Paraller Rubin-laser," Zeitschrift fier Naturforschung vol. 21a, no. 10, Oct. 1966, pp. 1731– 1732.

*Primary Examiner*—Ronald L. Wibert
*Assistant Examiner*—R. J. Webster
*Attorneys*—William C. Nealon, Noble S. Williams and Robert J. Bird ABSTRACT: A laser rod having a header coaxial therewith and abutting the rod at a cut which is oblique to the axis of the rod to substantially prevent focusing of the laser light at any single point in the rod. The focusing could cause damage to the rod.

PATENTED OCT 5 1971　　　　　　　　　　　　3,611,193

INVENTOR
PAUL G. DeBARYSHE

BY William C. Nealon
ATTORNEY

HEADER FOR A LASER ROD

FIELD OF THE INVENTION

The invention relates primarily to laser rods and systems and more particularly to laser devices for preventing focusing damage to such rods.

PRIOR ART

The problem arising in many of the laser rods used presently is that at various points throughout the rod thermal gradients in index of refraction produced by heat from the flash tube or other causes bend laser light rays, which are parallel at a particular cross section, so that the rays all cross each other at a particular point. This phenomenon of unwanted focusing causes local heating, unwanted absorption, and possible catastrophic damage to the rod.

In presently used laser systems, various techniques are employed for substantially eliminating the possibility of catastrophic focusing of laser light at particular points in the rod. Among these are the provision of laser rod material which is adjusted in index of refraction at various points throughout the rod to insure that the laser light remains parallel, to compensate for temperature gradients. Such adjustments make the manufacture of glass, gas, or crystal laser systems extremely difficult with less than desired success in achievement.

SUMMARY OF THE INVENTION

Accordingly, a primary object of the present invention is to eliminate unwanted focusing in laser rods.

A further object is to provide a reliable means for such elimination with relative ease of construction.

Such objects are accomplished in one preferred embodiment wherein a nonabsorbing header rod is aligned with the laser rod for mating therewith at a cut oblique to the axis of the rod and header. The rays at the cut are parallel to the axis and if bent by any index of refraction gradients of the like will intersect at different points along the rod.

Further objects, features, and embodiments of the present invention will become apparent upon consideration of the following detailed description in conjunction with the drawing, in which:

DETAILED DESCRIPTION OF THE PREFERRED EMBODIMENT

Figure 1:
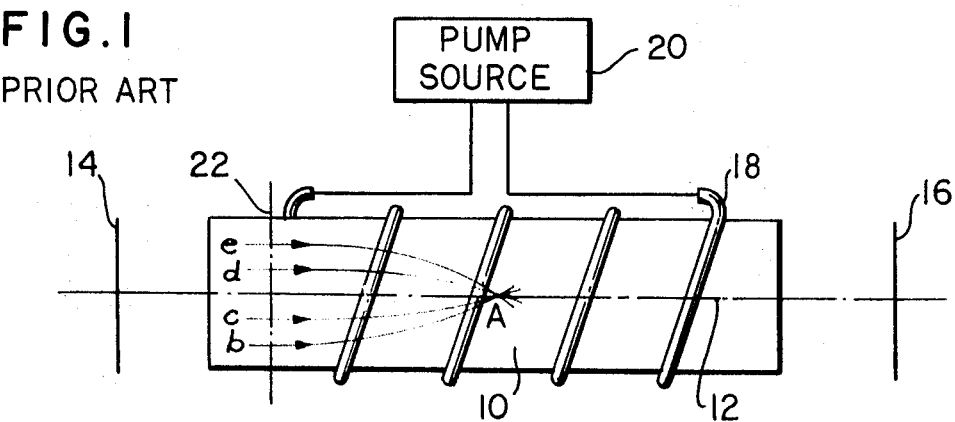
FIG. 1 is a schematic representation of a laser device according to the prior art.

Referring to FIG. 1, there is shown a commonly used laser structure such as that described by Townes and Schawlow in "Physical Review," Volume 112, page 1940 (1958). The structure comprises a rod 10 of suitable lasering material disposed in a high-Q resonant cavity of the Fabry-Perot Interferometer type with a reflector 14 on one end and a partially silvered mirror 16 (about 1-96 percent transmission) at the other end. When the lasering material is illuminated by a helical flash tube 18 or the like, an excess of population of upper level atoms of the lasering material is produced (commonly called negative temperature condition). This process of optical pumping with flash tube 18 is triggered by pump source electronics 20. Atoms in the upper level begin to fall spontaneously to lower levels in a process called fluorescence. By collision with other atoms during propagation back and forth in the cavity, the fluorescence stimulates additional upper to lower level transitions, usually referred to as induced emission. Superposition of the induced emission on the spontaneous emission takes place and the laser output in the form of highly coherent, monochromatic and intense light is emitted at the partially silvered mirror 16.

At any cross-section such as at 22 of the laser rod, if the laser rays b, c, d, e are parallel as desired, the index of refraction properties of the laser material can cause bending of the rays to focus at a common point A. Such focusing is undesirable since the highly intense laser light is capable of local heating, unwanted absorption and possibly catastrophic damage to the rod.

Figure 2:
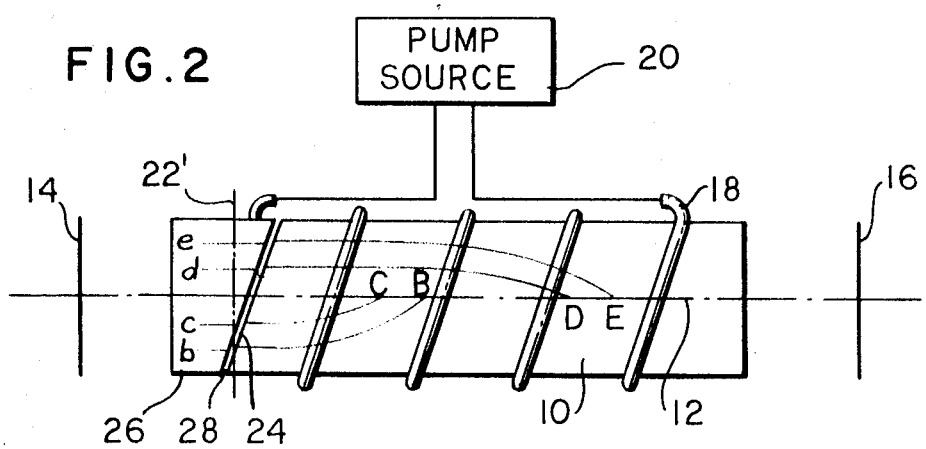
FIG. 2 is a schematic representation of the laser device of FIG. 1 in combination with a nonabsorbing header according to the present invention.
Figure 3:
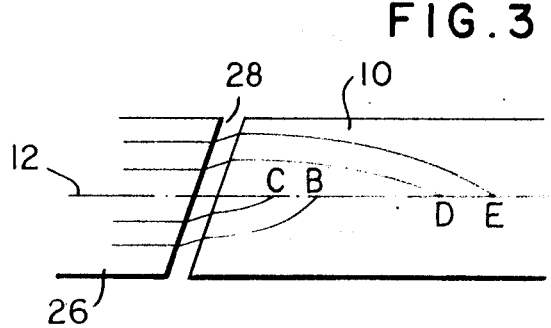
FIG. 3 is an exploded view of the oblique cut interface of FIG. 2.

The present invention is to provide an oblique cut 24 to the laser rod and a header 26 of nonabsorbing transparent material with a matching oblique cut within the cavity as shown in FIGS. 2 and 3. If the rays b, c, d, e are parallel at a particular cross section 22' of the header and at the cut 24 of FIG. 2, the rays b, c, d, e will not intersect at a common point and the undesired focusing referred to above is thereby avoided. As an example, the rays are shown as intersecting the axis at different points B, C, D, E.

The oblique cut interface is shown more clearly in FIG. 3, where it may be seen that the air interface 28, being of a lower index than the header 26, bends the rays further from the normal to the intersection of the air 28 and medium 26. The rays are thereby displaced upward (in the orientation of the drawing) and begin bending toward the axis of the laser material 10 under influence of the heat from the flash tube 18. (It is to be understood that the header, in this preferred embodiment is considered to be undoped with active laser material, and the laser material 10 is so doped). Since the oblique cut causes bending to occur in rays b, c, d, e, respectively, in that order, at a position in the laser rod further to the left (in the orientation of the drawing), the rays will intercept the axis at different positions C, B, D, E. The dangers of focusing are therefore avoided and the influence of heat from the flash tube producing index of refraction gradients in the rod minimized.

Figure 4:
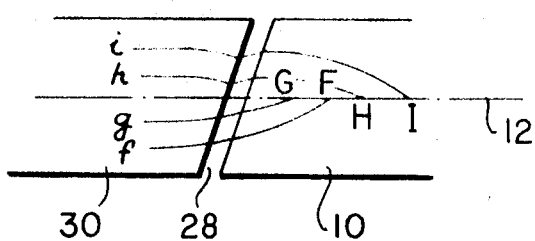
FIG. 4 is an exploded view of the oblique cut interface of an alternative embodiment.

An alternate embodiment of the invention would produce ray paths as illustrated in FIG. 4. The header 30 of FIG. 4 is made of the same material as the laser rod 10 and thereby experiences the same absorption problems with respect to heat from the flash tube 18. Its index of refraction is accordingly varied and bending of the rays f, g, h, i begins in the header. The air space between the header 30 and rod 10 at the oblique cut upwardly displaces the rays f, g, h, i, which have started to bend toward the cooler axial region in the header. The bending toward the axis continues in the laser rod 10 and the oblique cut causes a sequence of bending in the rays more toward the left of the illustration for rays f, g, h, i, in that order. Interception of the axis at various points G, F, H, I is thereby assured and undesired focusing substantially avoided.

A further modification of the invention is provided by those laser systems which use water or another fluid as a cooling medium for the rod. The gap between the header and rod is filled with water or another fluid and causes less displacement of the rays as they are propagated from the header to the rod 10. Furthermore, the cooling provided by the water at the periphery of the rod, causes a more erratic gradient in index of refraction. However, the oblique cut still provides a sufficiently sequenced bending of the rays to insure avoidance of focusing effects.

Further modification is contemplated by increasing the angle of the cut in order to provide more separation of the rays in the rod 10. A point of obliquity is attainable which positively avoids all possibility of catastrophic damage to the rod.

It should be understood that the apparatus of the invention is useful in not only laser generator devices as illustrated, but also in laser amplifier devices without end mirrors as well.

It is suggested in the preferred and other embodiments that the ends of the header and rod opposite to the oblique cut be planar and perpendicular to the common axis.

What is claimed is:

1. A laser assembly for compensating thermal lensing effects in a laser rod comprising:

a. a rod of active laser material having one end face which is perpendicular to its optical axis, and the other end face being cut oblique to said optical axis,
b. a header rod having its two end faces cut respectively perpendicular to and oblique to its optical axis, said header being positioned with its optical axis aligned collinear with the optical axis of the laser rod and with its oblique cut end spaced from and parallel to the oblique end of said laser rod,
c. the gap formed between said rod and said header comprising a medium with a refractive index lower than the refractive index of said rod or of said header so that when an increasing temperature gradient exists in said rod from its periphery to its center, light rays passing parallel to the optical axis of said head-rod assembly will be focused to different points along the optical axis of said rod inserted therefor.

2. The invention according to claim 1, wherein said header comprises nonabsorbing transparent material.

3. The invention according to claim 1, wherein said header comprises active lasering material.

4. The invention according to claim 2, wherein a fluid is disposed between said header and said rod in said oblique gap.

5. The invention according to claim 3, wherein a fluid is disposed between said header and said rod in said oblique gap.

6. The invention according to claim 4, wherein said fluid is air.

7. The invention according to claim 5, wherein said fluid is air.

8. The invention according to claim 4, wherein said fluid is water.

9. The invention according to claim 5, wherein said fluid is water.

10. The invention according to claim 2, wherein said device further comprises end mirrors displaced from the other ends of said rod and header, one of said mirrors being partially transmissive, said other ends being planar and perpendicular to the axis of said rod and header.